Nov. 1, 1966 B. I. SANDOR 3,281,970

THREE-DIMENSIONAL MODEL FOR ELECTRONIC EQUIPMENT DESIGN

Filed May 27, 1964

INVENTOR
B. I. SANDOR
BY John K. Mullarney
ATTORNEY

United States Patent Office 3,281,970

Patented Nov. 1, 1966

3,281,970

THREE-DIMENSIONAL MODEL FOR ELECTRONIC EQUIPMENT DESIGN

Bela I. Sandor, Summit, N.J., assignor to Bell Telephone Laboratories Incorporated, New York, N.Y., a corporation of New York Filed May 27, 1964, Ser. No. 370,423
5 Claims. (Cl. 35—53)

This invention relates to an aid for the mechanical design of electronic test equipment.

The mechanical designer of electronic test equipment is presented with a multitude of problems. On the one hand, since greater emphasis is being placed on smaller packaging, he must make maximum utilization of the space which is available to him. On the other hand, he must maintain sufficient isolation between critical components in order to eliminate unwanted coupling, an almost contradictory requirement to that of making maximum use of the space that is available.

In most electronic equipment the placement of components is not a one plane problem. In addition to the components which are mounted on the chassis, many others must be mounted on other planes such as the front panel. Hence, not only must the designer be concerned about how the chassis components are placed relative to each other, but he must also take into consideration whether the chassis components will electrically or mechanically interfere with components mounted on planes other than the chassis, such as the front panel. Furthermore, throughout his consideration of the placement of components within the equipment, the designer must also remain mindful of possible economies in connecting wires and terminals. In addition, the designer's problems are not limited to that of the interior variety; for, the arrangement on the front panel must be aesthetically pleasing and efficient from a human engineering standpoint in order to attract and satisfy the customer.

Heretofore, a series of drawings were generally required before the many people involved in the design of a piece of electronic equipment agreed on the design for a first prototype of the equipment. After construction of the prototype it was not uncommon to find that the drawings were inadequate in coping with the three-dimensional problems which are inherent in the placement of equipment components. For even if the components on the front panel were found to be arranged in an aesthetically pleasing and efficient pattern, they were not always found to conveniently intermesh with the components mounted on the chassis. Accordingly, more drawings and additional models were usually required before the optimum placement of all components was achieved.

A primary object of the present invention is to provide a design aid for determining the maximum space utilization of components in electronic equipment.

A further object is to provide a design aid wherein aesthetic and human engineering considerations can be given to the front panel design at the same time as considerations are given to the placement of components within the equipment.

A still further object is to provide a design aid which allows several parties to simultaneously participate in the mechanical design of the electronic equipment.

And still another object is to provide a design aid which is easy to construct and is inexpensive.

These and other objects are attained in accordance with the present invention wherein full scale mock-ups or models of components to be mounted on a chassis are arranged on a base in positions which the actual equipment components might possibly occupy when mounted on the chassis. Lightweight mock-ups or models of components intended to be mounted on the front panel are magnetically attached to a grid of parallel bars affixed to one face of a sheet of rigid transparent material, which in turn is supported in a position perpendicular to the base. A template having a cutout section equal to the contemplated available front panel area is adhesively attached to the other face of the transparent sheet. The models representing the front panel components are arranged in positions so as not to interfere with the models which represent the chassis components and so as to provide an efficient and aesthetically pleasing arrangement of components as viewed through the cutout section in the template representing the front panel area. When the mock-up components are finally located at positions that meet with the approval of all concerned, the component layout is noted and production of the actual equipment can begin.

Other objects and many of the attendant advantages of the invention will be readily appreciated as the same becomes better understood by reference to the following detailed description when considered in connection with the accompanying drawings in which.

Figure 1:
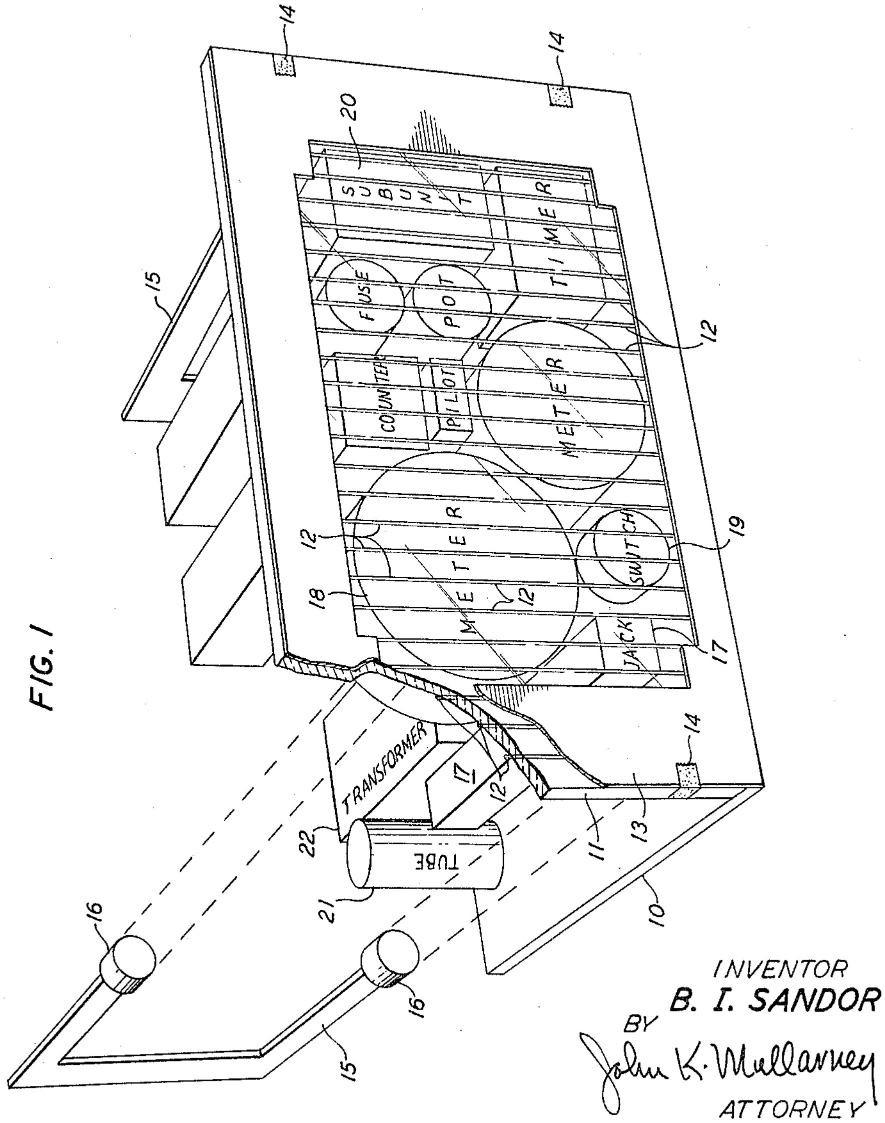
FIG. 1 is a pictorial representation of a design aid constructed in accordance with the present invention.

Referring now to FIG. 1, a wooden or heavy cardboard base 10, wth an area somewhat larger than the largest chassis under consideration, lends vertical support to a sheet 11 of transparent plastic material (such as the material sold under the trademark Plexiglas) which has an area somewhat larger than the largest front panel under consideration. A plurality of slender rods 12 of magnetic material (e.g., of iron or steel) are rigidly affixed in parallel relationship to each other across the entire face of sheet 11. The method by which the rods are affixed to the plastic sheet can be by wedging or gluing the ends of the rods into notches on opposite edges of sheet 11. Any method, however, of securing the rods to one face of sheet 11 may be utilized as long as vision through the transparent sheet is not impaired. An opaque template 13, preferably of paper and having a cutout section substantially equal to the area on the front panel which is available for the mounting of components, is attached by means of adhesive tapes 14 to the sheet 11 surface opposite that of the steel rods 12. Typically, the cutout section would not be perfectly rectangular but would contain irregularities corresponding to the area on the front panel which is reserved for mounting screws or bolts. Since template 13 is advantageously attached to sheet 11 simply by means of adhesive tapes 14, it can readily be replaced with another template having a larger or smaller cutout section corresponding to a larger or smaller front panel. U-shaped cardboard elements 15 having magnets 16 on each leg are magnetically attached to the steel rods 12 in positions which represent the outer limits available for the mounting of components. Other U-shaped cardboard elements with different dimensions may be utilized in order to represent chassis of various depths and equipment cases of various heights. Hence, the basic structure of base 10 and transparent sheet 11 with magnetic rods 12 in combination with several paper templates and varieties of U-shaped cardboard elements can represent a wide range of chassis and panel sizes.

Figure 2:
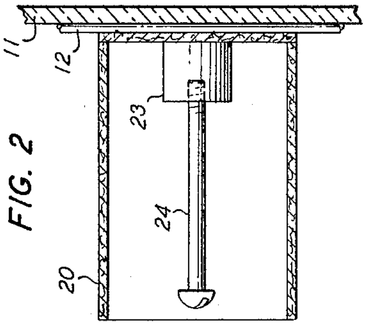
FIG. 2 is a cross-sectional detail of one embodiment of a mock-up or model representative of a component to be mounted on the front panel.

Three-dimensional mock-ups or models, such as rectangular boxes 17 and 20 and cylinders 18 and 19 in FIG. 1, having substantially the same volume and surfaces as the acutal components which are to be mounted on the front panel, are constructed of lightweight material, such as paper, cardboard, styrofoam, or polyurethane. These mock-up components can be made of a stiff manila paper with the rear surface purposely left open in order to provide access for a magnet which secures the front surface of the paper component to the vertical magnetic rods 12. For example, as indicated in the cross-sectional view of FIG. 2, the mock-up component is held to magnetic rods 12 by magnet 23. In the case of long and slender mock-up components, such as that shown in FIG. 2, it is advantageous to secure a long bolt 24 to the magnet, the mock-up component then being moved simply by grasping the end of the bolt.

Figure 3:
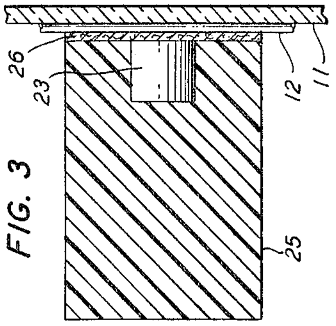
FIG. 3 is a cross-sectional detail of another embodiment of a model of a component to be mounted on the front panel.

The three-dimensional models can also be constructed of lightweight materials such as styrofoam, or polyurethane. These materials are easily carved and are therefore especially useful in the construction of models which have more complex shapes than the cylinders and rectangular boxes shown in FIG. 1. The magnet which holds such a styrofoam or polyurethane model to the steel rod grid can be held within the model as shown in FIG. 3 by simply wedging magnet 23 into a hole somewhat smaller than its diameter. It is also desirable in models using this type of construction to glue a paper mask 26 to the front surface thereof in order to permit the same to be labeled. This front surface will, of course, be visible through the exposed portion of sheet 11, as indicated in FIG. 1.

Other three-dimensional models representing components which are to be mounted in positions other than on the front panel, as for example on the chassis, may be constructed in the same way as the models described above, or they may also be constructed out of heavier materials since these objects can normally be held in position simply by gravity. If it is deemed desirable to add weight to a model representing a component to be mounted on the chassis, a magnet of course need not be used, and any substance adding weight such as sand or lead may be inserted therein in order to fix the position of the model in its proper location on base 10. In FIG. 1, the cylinder 21 and rectangular box 22, representative of a vacuum tube and transformer respectively, are located on the base in the possible positions that the actual components might occupy on the equipment chassis. In connection with the models or mock-up components it should be noted that box 17, representing a jack, could not be positioned in the location now occupied by cylinder 19, representing a switch, for to do so would cause an interference with box 22, representing the transformer. For the positions shown in FIG. 1, the switch represented by cylinder 19 would be mounted in a position on the front panel in front of the transformer represented by box 22, and the space behind the jack, represented by box 17, could be advantageously utilized for the placement of a vacuum tube reperesented by cylinder 21.

After intermeshing the models of the components on the two planes, the appearance presented by the models as viewed from the front through the cutout may be studied and judged from an aesthetic and human engineering standpoint. If any of those involved in the equipment design are dissatisfied with the arrangement, the objects may be easily detached and moved about to other positions in order to achieve the optimum in space utilization, aesthetic front panel design, and efficiency. Before attempting to find a better arrangement, a recording of the then existing arrangement of front panel components can easily be made on the front surface of the plastic sheet by means of a glazed surface pencil.

For purposes of illustration, the grid depicted in FIG. 1 comprises a plurality of vertically disposed rods 12 of magnetic material. It should be evident, however, that the rods could just as readily have been disposed horizontally, or at some arbitrary angle, or even some combination thereof (e.g., a grid of criss-cross wires). There is also nothing critical about the spacing between the rods—all that is necessary in this regard is that vision of the magnetically mounted, mock-up front panel components be substantially unimpaired. Accordingly, while for the purpose of illustrating and describing the present invention a particular embodiment has been shown in the drawings, it is to be understood that this embodiment is capable of such modifications as may be commensurate with the spirit and scope of the invention set forth in the accompany claims.

What is claimed is:

1. A mechanical design aid for electronic equipment which is to have some components mounted on a chassis and other components mounted on a front panel substantially perpendicular to the chassis comprising a grid of magnetic material having an area at least as large as the front panel under consideration, a base of rigid material having a surface at least as large as the chassis under consideration, a template of opaque material attached to said grid and having a cutout section substantially equal to the area which is available on the front panel for the mounting of components, a first set of models representing the chassis components positioned on said base in a proposed arrangement for the chassis components, a second set of models representing the front panel components, a plurality of magnets, at least one of said plurality of magnets magnetically attaching each model of said second set to the grid in a proposed position for the represented front panel component which permits the intermeshing with said chassis components and presents an efficient and aesthetically pleasing overall arrangement of front panel components.

2. A mechanical design aid for electronic test equipment as defined in claim 1 wherein said grid comprises a plurality of steel rods affixed to the surface of a plastic sheet.

3. An aid for the design of an electronic test set which has some circuit components mounted on a chassis and other components mounted on a front panel perpendicular to the chassis comprising a sheet of transparent rigid material, a plurality of rods of magnetic material rigidly affixed across one surface of said sheet substantially in parallel with each other at distances apart sufficiently greater than a single rod diameter so that vision through the sheet is substantially unimpaired, a base rigidly attached to one edge of said sheet for supporting the latter in a plane substantially perpendicular to said base, a template of opaque material adhesively attached to the other surface of said sheet and having a cutout section substantially equal to the area which is available on the front panel for the mounting of components, a first set of three-dimensional models each one of which has surfaces substantially the same as one of the components to be mounted on the chassis, each one of said first set of models positioned on said base at a location which corresponds to the proposed location relative to the front panel of the component which it represents, a second set of three-dimensional models each one of which has surfaces substantially the same as one of the components to be mounted on the front panel, a plurality of magnets, at least one of said magnets to be used with each one of said second set of models for magnetically attaching the latter to said plurality of rods in a proposed arrangement which permits the second set of models to intermesh with said first set of models and which permits the presentation of an aesthetically pleasing and efficient placement of components when viewed through the cutout section of the template representing the front panel area.

4. An aid for the design of an electronic test set comprising the elements of claim 3 in combination with a pair of U-shaped strips of rigid material having one of said plurality of magnets attached to the end of each leg of said U-shaped strips whereby each of the pair of U-shaped strips is magnetically attached to said plurality of rods at opposite ends of the transparent sheet in order to clearly define the interior volume of the test set which is to be occupied by components.

5. A mechanical design aid for electronic equipment in which some components are to be mounted on the chassis and other components are to be mounted on the front panel comprising a mock-up base having an area at least as large as the chassis under consideration, a mock-up front panel having an area at least as large as the front panel under consideration, said mock-up front panel being composed of a sheet of transparent material with a coextensive grid of magnetic elements secured to one face thereof, a template of opaque material attached to said mock-up front panel and having a cutout section substantially equal to the contemplated area of the front panel under consideration, a first set of full scale mock-up components adapted to be positioned on said base in the possible positions of components to be mounted on said chassis, a second set of full scale mock-up components representative of actual components to be mounted on the front panel under consideration, said second set of mock-up components having magnets associated therewith to permit the mock-up components to be positioned at locations on that portion of said grid defined by the template cutout, the said locations corresponding to the possible locations of the actual components to be mounted on the front panel under consideration, whereby the combination of an aesthetically pleasing front panel appearance and an optimized use of internal space can be expeditiously arrived at.

References Cited by the Examiner

UNITED STATES PATENTS

| | | | |
|---|---|---|---|
| 2,491,597 | 12/1949 | Adams | 35—53 |
| 2,528,211 | 10/1950 | Civkin et al. | 35—16 |
| 2,738,584 | 3/1956 | Parker | 35—16 X |
| 2,921,388 | 1/1960 | Stefaney | 35—73 |

References Cited by the Applicant

UNITED STATES PATENTS

| | | |
|---|---|---|
| 2,748,498 | 6/1956 | Stuart et al. |
| 2,882,618 | 4/1959 | Thompson. |
| 2,921,388 | 1/1960 | Stefaney. |
| 2,941,314 | 6/1960 | Schwieger. |
| 3,080,664 | 3/1963 | Bland. |

EUGENE R. CAPOZIO, *Primary Examiner.*

H. S. SKOGQUIST, *Assistant Examiner.*